(12) United States Patent
Carter

(10) Patent No.: US 8,365,184 B2
(45) Date of Patent: Jan. 29, 2013

(54) MULTI-CORE RESOURCE UTILIZATION PLANNING

(75) Inventor: Stephen R Carter, Spanish Fork, UT (US)

(73) Assignee: Apple Inc., Cupertino, CA (US)

( * ) Notice: Subject to any disclaimer, the term of this patent is extended or adjusted under 35 U.S.C. 154(b) by 1276 days.

(21) Appl. No.: 11/848,661

(22) Filed: Aug. 31, 2007

(65) Prior Publication Data

US 2009/0064158 A1 Mar. 5, 2009

(51) Int. Cl.
G06F 9/50 (2006.01)
G06F 11/30 (2006.01)

(52) U.S. Cl. .......................... 718/105; 702/182; 702/186
(58) Field of Classification Search .................. None
See application file for complete search history.

(56) References Cited

U.S. PATENT DOCUMENTS

| 7,206,966 | B2 * | 4/2007 | Barr et al. ................. 714/25 |
| 7,437,581 | B2 * | 10/2008 | Grochowski et al. ......... 713/320 |
| 7,596,430 | B2 * | 9/2009 | Aguilar et al. ............... 700/299 |
| 7,617,360 | B2 * | 11/2009 | Arai et al. ................... 711/114 |
| 7,756,666 | B2 * | 7/2010 | Aguilar et al. ............... 702/130 |
| 7,788,670 | B2 * | 8/2010 | Bodas et al. .................. 718/105 |
| 2005/0050373 | A1 * | 3/2005 | Orenstien et al. ............ 713/320 |
| 2005/0223382 | A1 | 10/2005 | Lippett |
| 2005/0240850 | A1 | 10/2005 | Ohwada et al. |
| 2005/0281275 | A1 * | 12/2005 | Haghighi ..................... 370/401 |
| 2006/0161875 | A1 * | 7/2006 | Rhee ................................ 716/14 |
| 2006/0227771 | A1 | 10/2006 | Raghunath et al. |
| 2007/0053161 | A1 | 3/2007 | Giardina et al. |
| 2007/0074011 | A1 * | 3/2007 | Borkar et al. ................. 712/227 |
| 2007/0078858 | A1 | 4/2007 | Taylor et al. |
| 2007/0078988 | A1 * | 4/2007 | Miloushev et al. ........... 709/227 |
| 2007/0260823 | A1 * | 11/2007 | Dickinson et al. ............ 711/153 |
| 2008/0109814 | A1 * | 5/2008 | Park .............................. 718/105 |
| 2008/0115010 | A1 * | 5/2008 | Rothman et al. ................ 714/10 |
| 2008/0163239 | A1 * | 7/2008 | Sugumar et al. .............. 718/105 |
| 2008/0168466 | A1 * | 7/2008 | Nitta et al. .................... 718/105 |
| 2010/0125845 | A1 * | 5/2010 | Sugumar et al. .................. 718/1 |

OTHER PUBLICATIONS

Ferreira, J.F.; Sobral, J.L.; Proenca, A.J.; , "JaSkel: a Java Skeleton-based framework for structured cluster and grid computing," Cluster Computing and the Grid, 2006. CCGRID 06. Sixth IEEE International Symposium on, vol. 1, no., pp. 4 pp., May 16-19, 2006.*

Shang, L.; Peh, L.-S.; Amit Kumar; Jha, N.K.; , "Temperature-Aware On-Chip Networks," Micro, IEEE , vol. 26, No. 1, pp. 130-139, Jan.-Feb. 2006.*

Calin Ciordas, Twan Basten, Andrei Radulescu, Kees Goossens, and Jef Van Meerbergen. 2005. "An event-based monitoring service for networks on chip". ACM Trans. Des. Autom. Electron. Syst. 10, 4 (Oct. 2005), 702-723.*

* cited by examiner

*Primary Examiner* — Qing Wu
(74) *Attorney, Agent, or Firm* — Meyertons, Hood, Kivlin, Kowert & Goetzel, P.C.

(57) ABSTRACT

Techniques for multi-core resource utilization planning are provided. An agent is deployed on each core of a multi-core machine. The agents cooperate to perform one or more tests. The tests result in measurements for performance and thermal characteristics of each core and each communication fabric between the cores. The measurements are organized in a resource utilization map and the map is used to make decisions regarding core assignments for resources.

25 Claims, 3 Drawing Sheets

MULTI-CORE RESOURCE UTILIZATION PLANNING

BACKGROUND

Computing devices are increasingly becoming more powerful and at the same time they are getting smaller; they are consuming less power and they possess exponentially more memory in relation to that which was done by their predecessor devices. For example, it is not uncommon today for a single user laptop to have more than one processor embedded in its chipset. In fact, recent industry pronouncements indicate that upwards of eighty processors have been successfully integrated into a single chipset design.

Having multiple integrated processors within a single chipset provides a variety of benefits. One obvious capability is parallel computing. That is, two or more threaded applications can execute at the same time and within the same device using different processors, thereby increasing processing throughput on that device.

Another benefit includes the establishment of multiple virtual machines from a single physical machine architecture. Although this is feasible with a single processor architecture, having a multiple processor architecture makes the creation and maintenance of virtual machines more practical. Additionally, the number of feasible virtual machines that can be executed on a single integrated device increases with a multiple processor architecture design.

Yet, one issue with a multiple processor architecture is that different virtual machines or threaded applications from different virtual machines can experience congestion or bottleneck situations within some processors or even between communication channels associated with the multiple processors. So, proactive maintenance, support, analysis, and load balancing are existing problems associated with the multiple processor architecture design.

Accordingly, there is a need for improved utilization planning and analysis that is associated with multiple processor architectures.

SUMMARY

In various embodiments, techniques for multi-core resource utilization planning are provided. More specifically, and in an embodiment, a method is provided for generating and using a utilization planning map for a multi-core machine architecture. An agent is deployed for processing on each core of a multi-core machine architecture of a machine. Next, a test is initiated; the test is to be performed by each agent in coordination with one another. Furthermore, the test evaluates performance characteristics for the cores and for communication occurring between each of the cores. Finally, a map is generated in response to test results produced by the agents. The map includes gathered measurements, which are associated with the performance characteristics, and the map is used for evaluating the multi-core architecture and making decisions regarding usage of particular cores or particular combinations of the cores.

DETAILED DESCRIPTION

Figure 1:
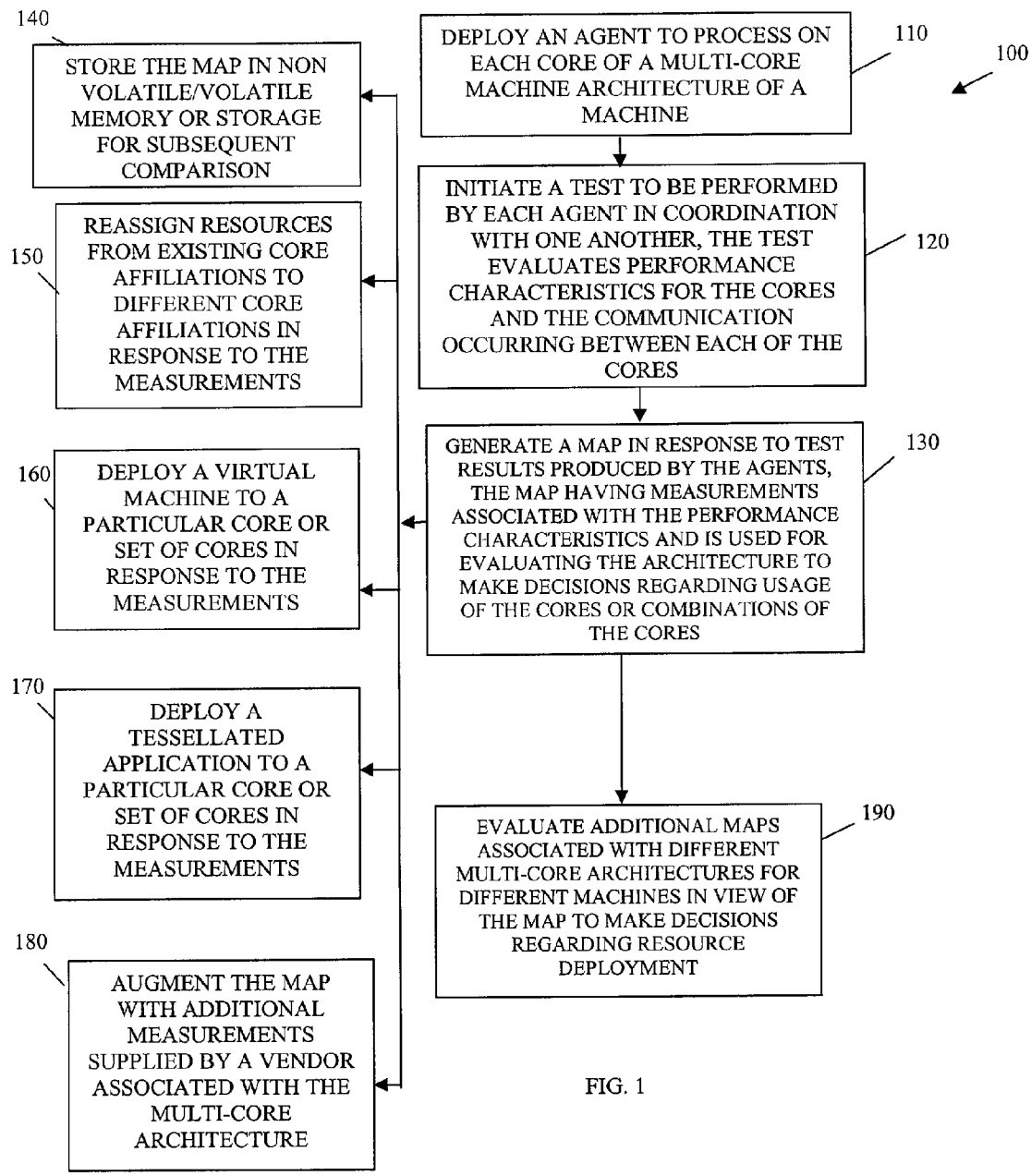
FIG. 1 is a diagram of a method for generating and using a utilization planning map for a multi-core machine architecture, according to an example embodiment.

A "resource" includes a user, content, a processing device, a node, a service, an application, a system, a directory, a data store, groups of users, combinations of these things, etc. The term "service" and "application" may be used interchangeably herein and refer to a type of software resource that includes instructions, which when executed by a machine performs operations that change the state of the machine and that may produce output.

A type or resource may also include a Virtual Machine (VM) or a tessellation application. Example tessellation applications and conditional tessellation applications may be found in U.S. Ser. No. 11/784,869, entitled: "Tessellated Virtual Machines for Common Computing Goals" and filed on Apr. 10, 2007; U.S. Ser. No. 11/731,062, entitled: "Tessellated Virtual Machines Conditionally Linked for Common Computing Goals" and filed on Mar. 30, 2007; and U.S. Ser. No. 11/811,546, entitled: "Tessellated Applications for User Computing Environments" and filed on Jun. 11, 2007; the disclosures all of which are incorporated by reference herein and below in their entireties.

Another type of resource is a "data center" that can include one or more physical and virtual processing environments. The data center may identity controlled in the manner described in U.S. Ser. No. 11/583,667 entitled: "Identity Controlled Data Center" and filed on Oct. 10, 2006; the disclosure of which is incorporated by reference herein and below in its entirety.

An "identity service" refers to a yet another special type of resource that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

A "core" refers to a physical processing device having a processor, memory, and other communication fabric for communicating with other devices. "Multi-core" refers to a single integrated processing device having two or more integrated cores therein on its chipset.

"Communication fabric" refers to the connections and resources associated with communication within a core (intra communication fabric) and communication between cores (inter communication fabric). Some example fabrics include: 1) inter-core communication fabric that allows one core to send process and status messages/events to another core; 2) shared memory fabric representing portions of memory shared by two or more cores; 3) assigned memory fabric representing portions of memory that may be assigned for exclusive use by a specific core or set of cores (the "set of cores" condition is a variant of shared memory fabric but from the perspective of a multi-threaded process, the several cores are act as a single system and the memory assigned to the computing environment may be viewed as being exclusively assigned to that computing environment); 4) shared cache fabric representing portions of system cache (e.g., Level 2 (L2) cache, etc.) shared between cores; 5) assigned cache fabric representing portions of system cache assigned for exclusive use by a particular core or set of cores; 6) specialized hardware fabric designed for handing certain kinds or types of processing, such as video texturing, video rendering, Input/Output (I/O) processing, etc., this fabric allows the core to use the specialized hardware; and 7) I/O fabric for I/O to disk storage communication, communication to network resources, etc.

It is noted that each fabric may have its own unique interconnect (N×N versus a mesh arrangement) and thus, its own unique congestion, thermal issues (overheating), etc. For example, a mesh may exhibit congestion at cross-points in its architecture if several cores are using the fabric in a way that uses a common intersection. Furthermore, areas of high traffic may cause unwanted thermal activity within the machine architecture.

Various embodiments of this invention can be implemented in existing chipset architectures for multi-core machines (processing devices) and/or existing Operating Systems (OS's) as specialized services.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

FIG. 1 is a diagram of a method 100 for generating and using a utilization planning map for a multi-core machine architecture, according to an example embodiment. The method 100 (hereinafter "multi-core utilization mapping service") is implemented as instructions in a machine-accessible and readable medium. The instructions when executed by a machine perform the processing depicted in FIG. 1. According to an embodiment, the multi-core utilization mapping service is also operational over and processes within a network. That network may be wired, wireless, or a combination of wired and wireless.

At 110, the multi-core utilization mapping service deploys an agent to process on each core of a multi-core machine architecture of a machine (also referred herein to as a "multi-core machine"). The agents are for performing tests on the cores to which they are deployed. Policy and configuration information may permit the automatic configuration and instantiation of each of the agents on their respective cores for processing.

According to an embodiment, the agents are removed after one or more tests are processed and a utilization map is produced for the cores and the communication fabrics of the cores. In another case, the agents are left on their cores to subsequent dynamic and on demand test processing for each of their respective cores. In the later case, the agents may also provide monitoring services that when viewed with policy permit tests to be automatically generated and processed when certain conditions or situations are detected on the cores.

At 120, the multi-core utilization mapping service initiates a test to be performed by each agent on their cores. The test results are coordinated amongst the agents. Furthermore, the test is designed to evaluate the performance characteristics of each cores and the communication (via the communication fabric of the multi-core machine) occurring between each of the cores. More details on the types of tests that are preformed are described in detail below with reference to the FIG. 2. Some measurements that may be included in the test results from the test include, but are not limited to, bandwidth capacity, congestion, connectivity status, and/or thermal characteristics (temperatures of the components of the fabric or core as a whole).

At 130, the multi-core utilization mapping service generates a utilization map in response to test results from the agents performing the tests on their cores and communication fabrics. The utilization map includes gathered measurements, which are associated with the performance characteristics. As will be detailed more completely herein and below, the utilization map is used for evaluating the multi-core architecture and making decisions regarding the usage of particular cores or particular combinations of the cores. So, the map details bandwidth, congestion, connectivity, thermal characteristics, and the like of the multi-core machine and its fabric.

According to an embodiment, at 140, the generated utilization map is stored in non-volatile memory or non-volatile storage for subsequent comparison and analysis. The map may be subsequently compared to a different multi-core machine or the map may be used for historical comparison of the same machine when subsequent maps are produced for that same machine.

In some embodiments, the multi-core utilization mapping service stores or retains some aspects of the generated utilization map in volatile memory or storage. In fact, the map may be partially stored in non volatile memory/storage and partially kept in volatile memory/storage. The portion in volatile storage may be reacquired each time the memory/storage is cleared and re-populated to memory/storage.

In an embodiment, at 150, the multi-core utilization mapping service evaluates the map in view of policy and reassigns resources from an existing core affiliation to a different core affiliation within the multi-core machine in response to the measurements of the map. So, depending upon resource priorities and performance capabilities of a particular core and its communication fabric with other cores, the multi-core utilization mapping service may dynamically reassign the resource to a different core or different set of cores. This may be viewed as dynamic load balancing although it does not always have to be, since in some cases the reassignment may occur for a variety of reasons, such as core failure, priority adjustments, additional specialized hardware for a specific type of processing (such as video), etc.

In another case, at 160, the multi-core utilization mapping service deploys a virtual machine (VM) to a particular core or a particular set of cores in response to the measurements of the utilization map. So, instantiation of a VM may depend on policy evaluated in view of the utilization map. The policy may dictate that the operational load of the multi-core machine and each core be considered before a particular core or set of cores are used for instantiating the VM.

In yet another situation, at 170, the multi-core utilization mapping service deploys a tessellated application or VM (note an application may be a VM) to a particular core or particular set of cores. Examples associated with a tessellated application were incorporated by reference herein and above. Note also that the tessellated application can be conditionally deployed to a particular core or particular set of cores. Again, policy may dictate that the operational load as detailed in the map be considered before any particular deployment occurs.

In an embodiment, at 180, the multi-core utilization mapping service augments the utilization map with additional measurements supplied by a vendor associated with the multi-core architecture of the multi-core machine. This vendor-supplied map may include such information as interconnectivity between cores (inter-core communication fabric), bandwidth, expected thermal load, etc. Thus, comparisons between what is publicly asserted by a vendor and what is actually present during operation can be made via the generated utilization map and the vendor-supplied map. Additionally, the test need not perform all permutations of component testing, since in some cases policy may dictate that certain measurements supplied by the vendor via the vendor-supplied map be accepted and used without further testing to confirm. In other cases, a worst-case/best-case measurement may be used when a conflict exists between what is generated as a measurement in the test and what is supplied as a measurement by the vendor.

According to an embodiment, at 190, the multi-core utilization mapping service evaluates additional maps associated with different multi-core architectures for different multi-core machines in view of the generated utilization map for purposes of making decisions regarding future resource deployment. In other words, there may be a data center of an enterprise that has many multi-core machines, each multi-core machine having its own map (generated via the processing detailed above—some may be supplied via a vendor, industry organization, etc.). The evaluation may lead to selective deployment of system resources on certain quarters of multi-core machines or some portions of resources being optimally dispersed across multiple cores of multi-core machines.

It is now appreciated how agents cooperate to run test on each core and communication fabric of a multi-core machine for purposes of generating measurements included in a utilization map for the machine. That map is then profitably used to make decisions regarding resource deployment and resource-to-core affiliations within the machine. This may help identify defective areas or dead spots not caught during manufacture or transport of the multi-core machine. It may also help identify conditions or bottlenecks when certain ones of the cores are interacting together or using a common core with one another. Thus, combinations of cores can be discovered where processing can become bottlenecked or can be improved and shared cores can be discovered that are problematic. Other conditions may also be discovered with respect to specific communication fabrics and specific cores or combinations of cores.

Figure 2:
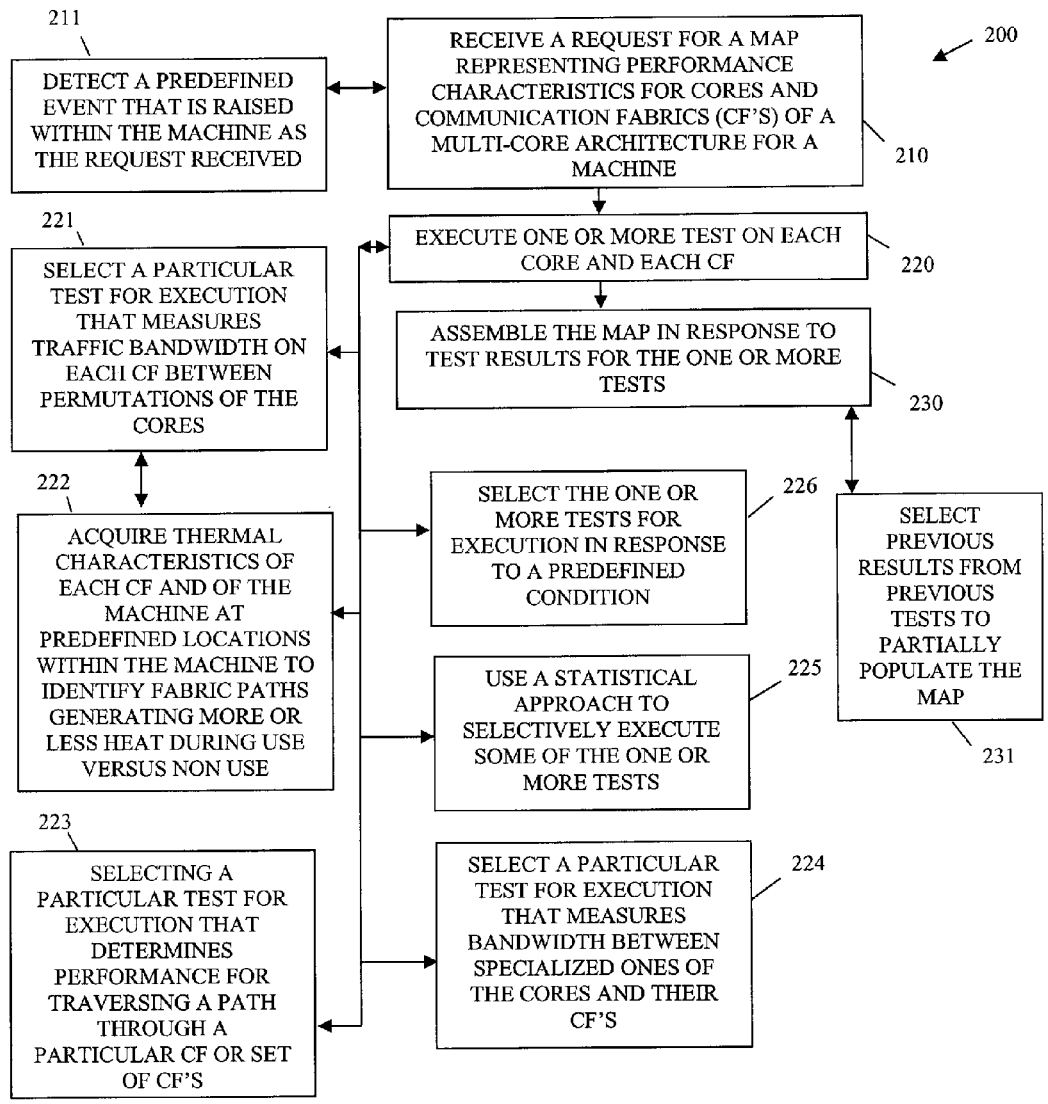
FIG. 2 is a diagram of another method for generating and using a utilization planning map for a multi-core machine architecture, according to an example embodiment.

FIG. 2 is a diagram of another method 200 for generating and using a utilization planning map for a multi-core machine architecture, according to an example embodiment. The method 200 (hereinafter "multi-core testing and mapping service" is implemented in a machine-accessible and readable medium as instructions. The instructions when executed by a machine perform the processing depicted in the FIG. 2. In an embodiment, the multi-core testing and mapping service may also be operational over a network; and the network may be wired, wireless, or a combination of wired and wireless.

The multi-core testing and mapping service represents an enhanced and more detailed perspective of the processing associated with the multi-core utilization mapping service represented by the method 100 of the FIG. 1. That is, the multi-core testing and mapping service shows more detailed embodiments and processing associated with the multi-core testing used in producing the utilization map.

At 210, the multi-core testing and mapping service receives a request for a utilization map representing performance characteristics or a performance profile of cores and communication fabrics between the cores within a multi-core machine and for the multi-core machine as a whole.

In an embodiment, at 211, the multi-core testing and mapping service detects a predefined system event that is raised within the multi-core machine as the request received at 210. In other words, predefined events (predefined based on configuration and/or policy) are detected by the multi-core testing and mapping service and associated with a request for the multi-core testing and mapping service to generate a utilization map. Some example events may include, but are not limited to, power-on, power-off, system events, etc.

At 220, the multi-core testing and mapping service executes or causes to be executed (via agents as discussed above with reference to the method 100 of the FIG. 1) one or more tests on each core and each communication fabric.

In an embodiment, at 221, the multi-core testing and mapping service selects a particular test for execution that measures traffic bandwidth on each communication fabric and between permutations of the various cores. That is, the testing evaluates bandwidth and thermal conditions on each fabric (e.g., shared memory, assigned memory, inter-core communication, etc.) between each permutation of communication one-to-one core communication, two-to-one core communication, two-to-two core communication, etc. In an embodiment, the permutations are coordinated so that the full geometry of the multi-core machine is evaluated (e.g., when two-to-one is being tested multiple tests are run to permute the set of two throughout the geometry of the multi-core machine). Again, dead spots or defective areas are identified and noted during the test.

In another case, at 222, the multi-core testing and mapping service acquires thermal characteristics of each communication fabric and of the machine as a whole at predefined locations of interest within the multi-core machine to identify fabric paths that are generating more or less heat during use versus non use.

In yet another situation, at 223, the multi-core testing and mapping service selects a particular test for execution that determines performance for traversing a path through a particular communication fabric or set of communication fabrics. Various path finding mechanisms may be used to specify the paths being tested (e.g., best path, shortest path, longest path, worst path, etc.).

In still another case, at 224, the multi-core testing and mapping service selects a particular test for execution that measures bandwidth between specialized ones of the cores and their communication fabrics. So, traffic bandwidth tests are also run between specialized cores (e.g., video accelerator, etc.) and permutations of one or more cores. Again, thermal impact is evaluated and noted during these tests.

According to an embodiment, at 225, the multi-core testing and mapping service can use a statistical approach to selectively execute some of the one or more tests. In other words, all permutations of communication paths and fabrics within the multi-core machine need not be tested; rather, selective and representative samples may be tested to produce a performance projection for the machine and the machine communication fabric as a whole. Statistical sampling and modeling may permit the tests to be run more efficiently for purposes of producing the utilization map.

In a situation, at 226, the multi-core testing and mapping service selects one or more tests for execution in response to a predefined condition. So, certain configurations, policies, events, etc. may define and be used in concert with a predefined condition to determine what test to run against which piece of the multi-core machine.

At 230, the multi-core testing and mapping service assembles the utilization map in response to test results associated with the tests that were performed.

In some cases, at 231, the multi-core testing and mapping service selects previous results from previous tests to at least partially populate the utilization map. In other words, a vendor or some other industry committee or watch dog may have supplied results or measurements for some core components or fabric components and the multi-core testing and mapping service can accept those and use those to partially populate the map. In this manner, every fabric and every component of the multi-core machine need not be tested in every situation.

Figure 3:
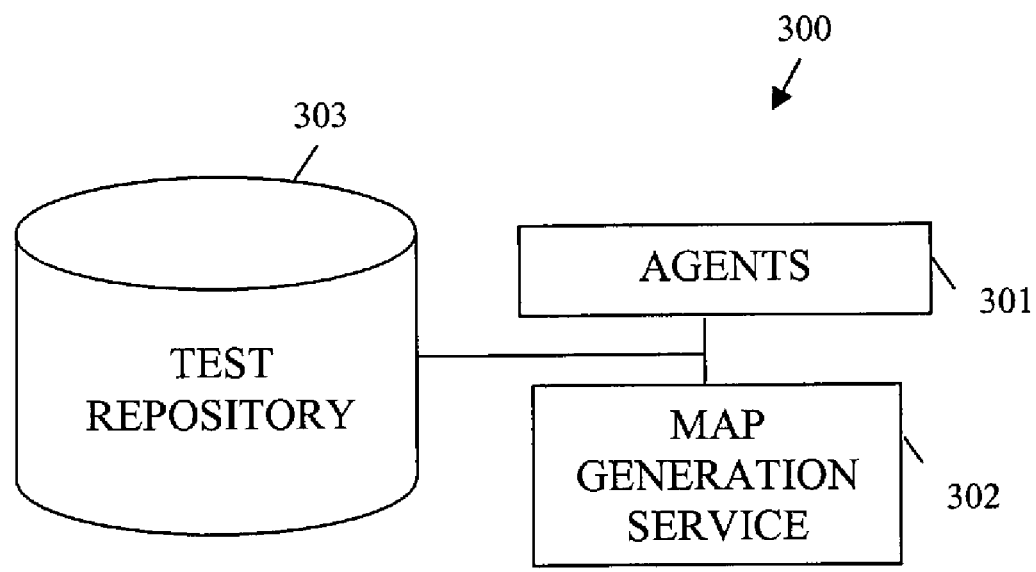
FIG. 3 is a diagram of a multi-core utilization planning system, according to an example embodiment.

FIG. 3 is a diagram of a multi-core utilization planning system 300, according to an example embodiment. The multi-core utilization planning system 300 is implemented as instructions on or within a machine-accessible and readable medium. The instructions when executed by a multi-core machine architecture for a machine performs the processing depicted in the methods 100 and 200 of the FIGS. 1 and 2, respectively. The multi-core utilization planning system 300 may also be operational over a network that may be wired, wireless, or a combination of wired and wireless.

The multi-core utilization planning system 300 includes a plurality of agents 301 and a map generation service 302. In an embodiment, the multi-core utilization planning system 300 also includes a test repository 303. Each of these and there interactions with one another will now be discussed in turn.

The agents 301 are each implemented in a machine-accessible and readable medium. Each agent is deployed and processed on a different core of a multi-core machine. Example processing and features of an agent 301 was provided in detail above with reference to the multi-core utilization mapping service represented by the method 100 of the FIG. 1 and with respect to the multi-core testing and mapping service represented by the method 200 of the FIG. 2.

The agents 301 perform tests against each core and communication fabrics between the cores. Additionally, the agents 301 supply performance measurements in response to executing the tests, the performance measurements are supplied to the map generation service 302.

In an embodiment, the agents 302 also monitor the normal day-to-day operational performance of the cores and the communication fabrics during operation of the multi-core machine. Monitoring measurements may similarly be supplied in a dynamic and real time fashion to the map generation service 302 for purposes of dynamically updating the utilization map or for purposes of producing different versions of the utilization map.

According to an embodiment, the agents 302 are removed from the cores and the multi-core machine once the tests are run and the map is created by the map generation service 302. Thus, usage of the agents 302 may be temporary for purposes of establishing a utilization or performance map.

The map generation service 302 is implemented in a machine-accessible and readable medium and is to process on one or more of the cores of the multi-core machine. Example processing and features of the map generation service may also be found above in detail with reference to the multi-core utilization mapping service represented by the method 100 of the FIG. 1 and with respect to the multi-core testing and mapping service represented by the method 200 of the FIG. 2.

The map generation service 302 collects and coordinates test results produced by the agents 301 and organizes the information into a utilization map. The test results are performance measurements or characteristics for each core and each communication fabric between permutations of the cores. Again, some results may be acquired via a third-party, such as vendor supplied specifications, etc. The map may also be viewed as a performance map for each core and each communication fabric.

Other services or even features of the map generation service 302 may be used to evaluate the performance map of the multi-core machine. This can be done for purposes of dynamically and automatically reassigning resources to different core affiliations or sets of cores. Additionally, different versions of a map associated with the same multi-core machine taken at different points in time and under different circumstances may be compared to find an optimal configuration or resources for the multi-core machine. Still further, maps of different machines may be compared against the map of the machine produced by the map generation service 302 for purposes of resource allocation within a data center having multiple multi-core machines and environments.

In an embodiment, the multi-core utilization planning system 300 may also include a test repository 303. The test repository 303 is implemented in a machine-accessible and readable medium and is accessible to the agents 301 and the map generation service 302. The test repository 303 may include a file, a directory, a database, or various combinations of these things.

The test repository 303 may supply or have particular tests selected in response to policy or dynamic conditions evaluated by the agents 301 or even the map generation service 302. Furthermore, the tests can be statistically sampled or based to achieve a representative sample, such that not all fabric permutations have to perform a given test. Also, some test can be supplied from a vendor or another third-party service to the test repository 303.

Figure 4:
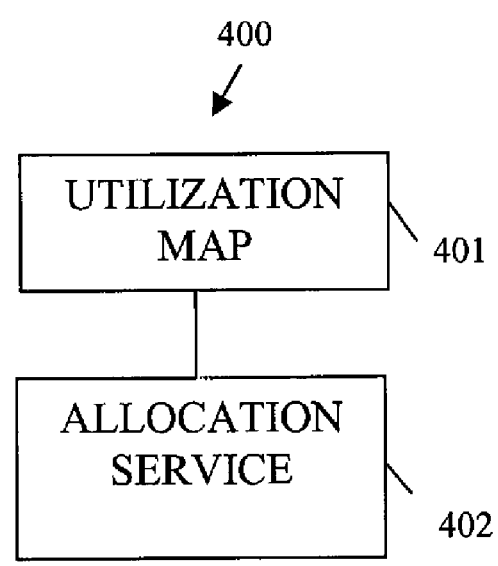
FIG. 4 is a diagram a multi-core allocation system, according to an example embodiment.

FIG. 4 is a diagram a multi-core allocation system 400, according to an example embodiment. The multi-core allocation system 400 is implemented as instructions on or within a machine-accessible and readable medium. The instructions when executed by a multi-core machine perform enhanced processing depicted with respect to the methods 100 and 200 of the FIGS. 1 and 2, respectively. In an embodiment, the multi-core allocation system 400 is also operational over a network 410 and the network 410 may be wired, wireless, or a combination of wired and wireless.

The description of the system 300 focused on production of a utilization map, and the enhanced processing associated with multi-core allocation system 400 focuses on using that map to make core allocation decisions.

The multi-core allocation system 400 includes a utilization map 401 and an allocation service 402. Each of these and their interactions with one another will now be discussed in turn.

The utilization map 401 is implemented in a machine-accessible and readable medium and is accessed by the allocation service 402. Techniques for creating or generating the utilization map 401 were discussed in detail above with reference to the methods 100 and 200 of the FIGS. 1 and 2, respectively, and with reference to the system 300 of the FIG. 3.

The utilization map 401 can be organized as any user-defined data structure, such as but not limited to a table, a matrix, an array, etc. The entries of the map 401 identify a particular component of a core or communication fabric and its relationship to other fabrics. Measurements are included for bandwidth, connectivity status/performance, thermal readings or characteristics, congestion, etc.

In an embodiment, some entries in the map 401 may not be modified and may be signed by a particular resource having a particular identity. For example, suppose a vendor of reliable source asserts a particular measurement or reading for a core communication fabric, that may be noted in the map 401 and signed by that identity. Authentication services, signing services, etc. may be used via an identity service, such as the identity service discussed and incorporated by reference herein and above. Other variations can come into play as well, such as when measurements for cells of the map 401 require authentication or security access to be changed or require a particular policy to be complied with before they can be changed. Again, an identity service may used to facilitate this type of enhanced processing against the map 401.

According to an embodiment, the map 401 is dynamically updated or adjusted in response to policy and based on operational conditions occurring and being monitored within the cores and the communication fabrics of the multi-core machine.

The allocation service 402 is implemented in a machine-accessible and readable medium and is to process on a particular core of a multi-core machine.

The allocation service 402 inspects measurements included in the utilization map 401 and makes decisions for allocating resources within the multi-core machine. Again, the measurements represent both performance and thermal characteristics of the cores and the communication fabrics between the cores of the multi-core machine.

In an embodiment, policy is used to automatically drive the actions taken by the allocation service 402. In another case, the allocation service 402 receives a manual administrator directed decision to perform a certain assignment of a resource to a particular core or set of cores. So, the allocation service 402 can automatically and dynamically make decisions on allocation based on its analysis of the map 401 vis-à-vis policy and the allocation service 402 can be manually overridden by instruction received from an administrator.

The resource can include a VM, an application, and/or a tessellation application or tessellation VM.

In an embodiment, at least one core of the multi-core architecture for the multi-core machine is reserved for the allocation service 402 and the utilization map 401 generation processing and maintenance. Such an architecture may improve the availability of maps 401 and the performance of the multi-core machine as a whole.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
deploying an agent to process on each core of a multi-core machine, each agent configured to automatically configure and instantiate itself on that agent's deployed core;
initiating a test that is to be performed by each agent in coordination with one another, wherein the test evaluates performance characteristics for the cores and for communication occurring between each of the cores, the performance characteristics evaluated on each core by a particular agent include bandwidth capacity, congestion, connectivity status, and thermal characteristics; and
generating a map in response to test results produced by the agents, wherein the map includes gathered measurements associated with the performance characteristics, wherein the map is evaluated with respect to the multi-core architecture for making decisions regarding usage of particular combinations of the cores.

2. The method of claim 1 further comprising, storing the map in at least one of non volatile memory or storage and volatile memory or storage for historical comparison or comparison to a different multi-core machine architecture.

3. The method of claim 1 further comprising, reassigning resources from existing core affiliations to different core affiliations in response to the gathered measurements of the map.

4. The method of claim 1 further comprising, deploying a virtual machine to a particular core or a particular set of the cores in response to the gathered measurements of the map.

5. The method of claim 1 further comprising, deploying a tessellated application to a particular core or a particular set of the cores in response to the gathered measurements of the map.

6. The method of claim 1 further comprising, augmenting the map with additional measurements supplied by a vendor associated with the multi-core architecture.

7. The method of claim 1 further comprising, evaluating additional maps associated with different multi-core architectures for different machines in view of the map to make decisions regarding resource deployment.

8. A method, comprising:

receiving a request for a map representing performance characteristics for cores and communication fabrics between cores of a multi-core architecture for a machine, each communication fabric represents particular connections and particular communication resources within a particular core and between particular cores of the multi-core architecture;

executing one or more tests on each core and each communication fabric, a particular agent deployed to each core performs the one or more tests on that core; and assembling the map in response to test results for the one or more tests.

9. The method of claim 8, wherein receiving further includes detecting a pre-defined event that is raised within the machine as the request received.

10. The method of claim 8, wherein executing further includes selecting a particular test for execution that measures traffic bandwidth on each communication fabric between permutations of the cores.

11. The method of claim 10, wherein executing further includes acquiring thermal characteristics of each communication fabric and of the machine as a whole at predefined locations within the machine to identify particular communication fabric paths that generate at least one of: more or less heat during use versus non use.

12. The method of claim 8, wherein executing further includes selecting a particular test for execution that determines performance for traversing a path through a particular communication fabric or set of communication fabrics.

13. The method of claim 8, wherein executing further includes selecting a particular test for execution that measures bandwidth between specialized ones of the cores and their communication fabrics.

14. The method of claim 8, wherein executing further includes using a statistical approach to selectively execute some of the one or more tests to develop a performance projection for the machine and a machine communication fabric as a whole.

15. The method of claim 8, wherein executing further includes selecting the one or more tests for execution in response to a pre-defined condition.

16. The method of claim 8, wherein assembling further includes selecting previous results from previous tests to partially populate the map.

17. A system, comprising:

a plurality of agents implemented in a machine accessible medium, each agent deployed and processed on a different core of a multi-core machine; and a map generation service implemented in a machine accessible medium and to process on one or more of the cores of the multi-core machine;

wherein the agents perform tests against each core and communication fabrics between the cores and the agents supply performance measurements in response to executing the tests to the map generation service, each agent configured to automatically configure and instantiate itself on that agent's deployed core, the performance measurements supplied on each core by a particular agent include bandwidth capacity, congestion, connectivity status, and thermal characteristics, and wherein the map generation service creates a performance map for the multi-core machine detailing the performance measurements for each core and each communication fabric, each communication fabric represents particular connections and particular communication resources within a particular core and between particular cores of the multi-core machine.

18. The system of claim 17 further comprising, a test repository implemented in a machine-accessible and readable medium, the test repository including the tests that are supplied to the agents.

19. The system of claim 17, wherein at least one test is supplied from the test repository in response to a predefined condition.

20. The system of claim 17, wherein the agents are removed from the machine once the map is created.

21. The system of claim 17, wherein the agents monitor operational performance of the cores and the communication fabrics during operation of the machine and the map generation service dynamically updates the map or produces different versions of the map in response to information supplied by the agents.

22. A system, comprising:

a utilization map implemented in a machine accessible and readable medium and accessed by an allocation service that processes on a multi-core machine; and the allocation service implemented in a machine accessible and readable medium and to process on a particular core of the multi-core machine;

wherein the allocation service inspects measurements included in the utilization map and makes decisions for allocating resources within the multi-core machine, and wherein the measurements represent performance and thermal characteristics of cores and communication fabrics between the cores of the multi-core machine, the performance and thermal characteristics include bandwidth, connection status/performance, thermal readings or characteristics, and congestion, each communication fabric represents particular connections and particular communication resources within a particular core and between particular cores of the multi-core machine.

23. The system of claim 22, wherein the resources include at least one of a virtual machine, an application, and a tessellation application.

24. The system of claim 22, wherein at least one core of the multi-core architecture is reserved for the allocation service and the utilization map generation and maintenance.

25. The system of claim 22, wherein the utilization map is dynamically updated in response to operational conditions occurring within the cores and the communication fabrics of the multi-core machine.

* * * * *